Patented Oct. 17, 1922.

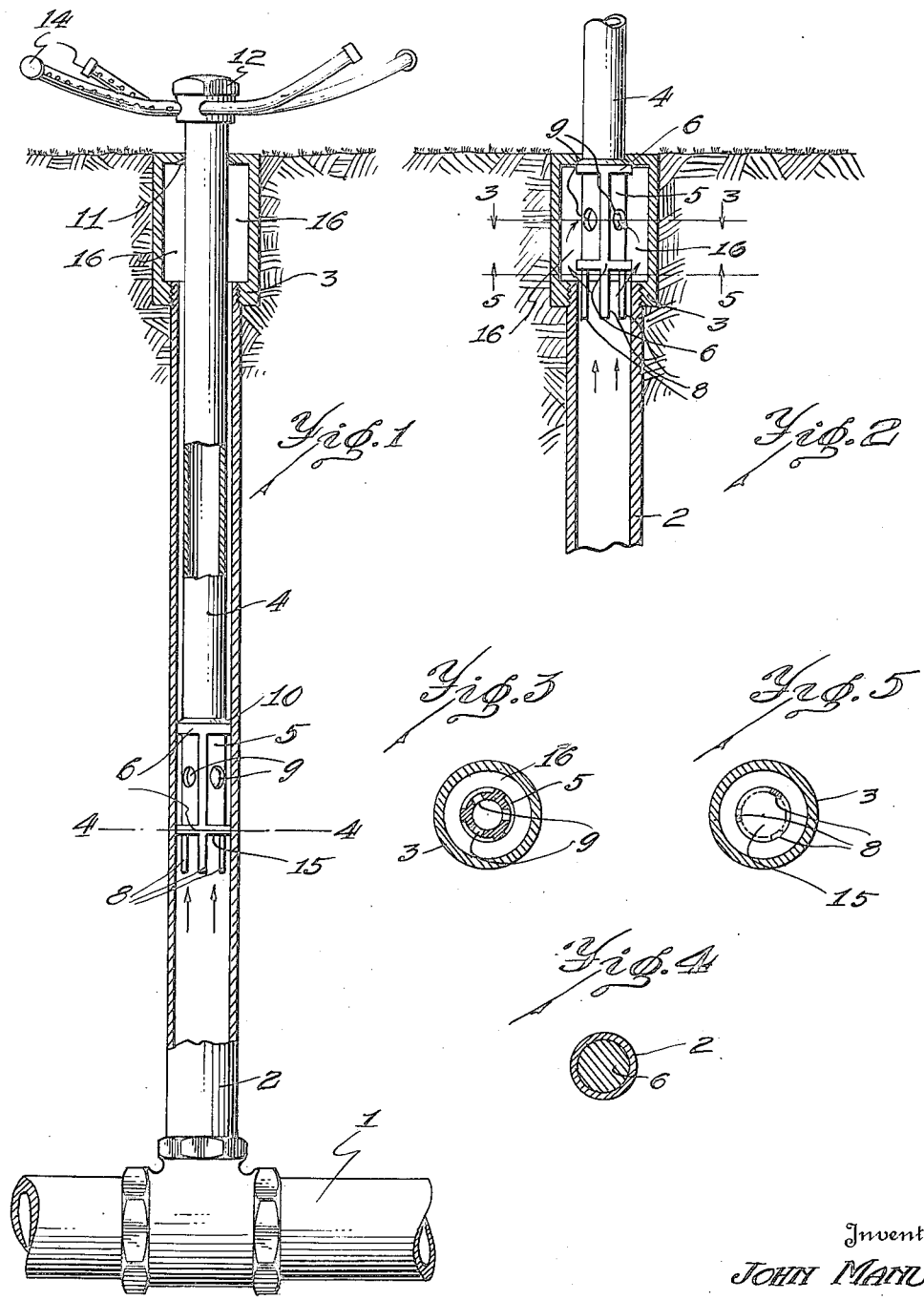

1,432,479

UNITED STATES PATENT OFFICE.

JOHN MANU, OF DETROIT, MICHIGAN.

STANDARD FOR LAWN SPRINKLERS.

Application filed August 19, 1920. Serial No. 404,696.

*To all whom it may concern:*

Be it known that I, JOHN MANU, a citizen of the United States, residing at Detroit, county of Wayne, State of Michigan, have invented a certain new and useful Improvement in Standards for Lawn Sprinklers, and declare the following to be a full, clear, and exact description of the same, such as will enable others skilled in the art to which it pertains to make and use the same, reference being had to the accompanying drawings, which form a part of this specification.

This invention relates to standards for lawn sprinklers and the object of the invention is to provide a contruction whereby the sprinkler head is raised from the ground to the position for sprinkling by the water pressure. A further object of the invention is to provide a device of the character described in which the water is not discharged from the sprinkler head until the head has reached the proper position. A still further object of the invention is to provide a sprinkler which is continuously supported by the water pressure and while held in the said position provides a seal whereby leakage of water is prevented. These objects and the several novel features of the invention are hereinafter more fully described and claimed and the preferred form of construction by which these objects are attained is shown in the accompanying drawings in which—

Fig. 1 is a section through a sprinkler, standard and water supply line embodying my invention.

Fig. 2 is a section through the tube and water supply line when the sprinkler is in the sprinkling position.

Fig. 3 is a section taken on line 3—3 of Fig. 2.

Fig. 4 is a section taken on line 4—4 of Fig. 1.

Fig. 5 is a section taken on line 5—5 of Fig. 2.

As shown in Fig. 1, a water supply line 1 is provided which extends underground below the frost line. Connected to and opening into the water supply line 1 is an upright feed line 2 which is threaded at its upper end and a cylindrical member 3 is provided which is threaded on the upper end of the feed line 2 and extends even with the surface of the ground. Within the supply line 2 is a tube 4 which at the lower end thereof is formed with a pair of spaced rings 6 fitting the inner wall of the feed line 2 and between the rings 6 are ribs 7 which extend downwardly and provide prongs 8 which, when in the position shown in Fig. 2, provide a guide for the return of the tube 4 into the feed line 2. In the lower end of the tube 4 between the ribs 7 are apertures 9 leading to the interior of the tube 4 and through which the water may pass to the interior of the tube when in the position shown in Fig. 2. The extreme lower end of the tube 4 adjacent the lower ring 6 is closed as shown in Fig. 4 to provide a face against which the water under pressure may act to lift the tube end into the cylinder 3. The upper surface of the upper ring 6 is provided with a beveled edge 10 which is adapted to fit the bevel 11 in the cylindrical member 3 when the tube 4 is in the uppermost position shown in Fig. 2 and prevent water from leaking around the tube. On the upper end of the tube 4 is a sprinkler head 12 provided with several arms 13 leading therefrom through which the water may pass when the sprinkler is in the uppermost position. The arms 13 are each provided with a series of apertures on the inner face thereof through which the water is directed in fine steams the force of the water discharging from the said apertures causing the head and arms to rotate and sprinkle a large area, as will be readily understood. The type of rotating sprinkler head just described is generally used for parks but it is to be understood that any type of sprinkler head may be used with this device.

The device is intended for sprinkling parks, truck gardens or the like and when used for this purpose a large number of sprinklers are spaced about the park or garden and connected to water supply lines similar to the line 1. When the water main is opened, usually at some distance from the sprinklers, the water under pressure is directed upwardly in the feed pipe 2 and comes in contact with the lower closed face 15 of the tube 4 thereby forcing the tube 4 and sprinkler head upwardly to the position for sprinkling. When the lower end 5 of the tube 4 is moved upwardly into the cylindrical member 3 as shown in Fig. 2, the beveled face 10 contacts the beveled portion 11 of the member 3 and prevents leakage of water between the tube 4 and adjacent portion of the member 3. The cylindrical member 3 is of considerably greater diameter than the end 5 of the tube 4 so that when the end 5 is in the position shown in Fig. 2, the water will pass upwardly between the prongs 8 and through the space 16 of the member 3 as indicated by the arrows in Fig. 2. Due to the pressure of the water in the member 3 the water will pass through the apertures 9 in the end 5 and upwardly through the tube 4 and will be discharged from the arms 13 which causes rotation of the sprinkler head. The sprinklers are so set in relation one to the other about the park or garden that the combined sprinklers will sprinkle the entire area thereof. When the ground has been sprinkled sufficiently the water main is shut off which leaves a quantity of water remaining in the feed line 2. As there is no pressure on this water the tube 4 and component parts will settle slowly into the feed line 2 due to the slight leakage between the members 6 and wall of the feed line until the sprinkler has returned to the position shown in Fig. 1 at which time the sprinklers may be again operated by simply opening the water main.

From the foregoing description it becomes evident that the device is very simple and efficient and automatic in operation and accomplishes the objects desired and, by the construction shown, water cannot enter the tube 4 until the end 5 thereof is in the position shown in Fig. 2.

Having thus fully described my invention, its utility and mode of operation, what I claim and desire to secure by Letters Patent of the United States is—

1. In a standard for lawn sprinklers, a vertical water feed line, a tube reciprocably mounted therein and closed at the lower end, a cylindrical chamber at the upper end of the water feed line through which the tube extends, the tube having an enlarged lower portion fitting the inner wall of the said line, and means whereby when the tube has risen to its maximum extent, communication is established between the feed line and said chamber, said tube being further provided with a series of apertures in said enlarged portion opening the interior of the tube to the chamber when the tube is in its uppermost position.

2. In a standard for lawn sprinklers, a vertical water feed line, a tube reciprocable therein closed at its lower end, said lower end having an enlargement fitting the water feed line, said feed line being provided with an enlarged chamber at the upper end, the length of which is greater than that of the enlarged portion of the tube whereby when the tube has risen to its maximum extent, communication is established between the feed line and the chamber, said enlarged portion of the tube having a valve seating against and closing the aperture in the chamber through which the tube extends when at its maximum height, said enlarged portion of the tube having apertures through which water may flow from the chamber.

3. In a standard for lawn sprinklers, a vertical water feed line, a tube reciprocably mounted therein having a closed lower end and a portion fitting the feed line, a cylindrical chamber greater in diameter than the feed line at the upper end thereof through which the tube extends, the arrangement being such that when a tube has risen to its maximum extent the feed line is opened to the chamber, the said tube having a series of apertures in the wall thereof open to flow of water through the said chamber when the tube is at maximum height, and a sprinkler head on the upper end of the tube.

In testimony whereof, I sign this specification.

JOHN MANU.